United States Patent
Gong et al.

(10) Patent No.: US 6,377,924 B1
(45) Date of Patent: Apr. 23, 2002

(54) METHOD OF ENROLLING PHONE-BASED SPEAKER SPECIFIC COMMANDS

(75) Inventors: Yifan Gong, Plano; Coimbatore S. Ramalingam, Dallas, both of TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/501,884

(22) Filed: Feb. 10, 2000

Related U.S. Application Data
(60) Provisional application No. 60/124,121, filed on Mar. 12, 1999.

(51) Int. Cl.[7] .................................................. G01L 15/14
(52) U.S. Cl. ........................................ 704/256; 704/255
(58) Field of Search .......................... 704/256, 246, 704/251, 255

(56) References Cited

U.S. PATENT DOCUMENTS

| | | | |
|---|---|---|---|
| 5,317,673 A | * 5/1994 | Cohen et al. | 704/323 |
| 5,572,624 A | * 11/1996 | Sejnoha | 704/256 |
| 5,794,192 A | * 8/1998 | Zhao | 704/244 |
| 5,839,105 A | * 11/1998 | Ostendorf et al. | 704/256 |
| 5,895,447 A | * 4/1999 | Ittycheriah et al. | 704/231 |
| 5,930,753 A | * 7/1999 | Potamianos et al. | 704/256 |
| 6,151,573 A | * 11/2000 | Gong | 704/256 |

OTHER PUBLICATIONS

Neena Jian, et al., "Creating Speaker–Specific Phonetic Templates with a Speaker–Independent Phonetic Recognizer: Implications for Voice Dialing" IEEE, pp. 881–884, 1996.

* cited by examiner

*Primary Examiner*—Richemond Dorvil
*Assistant Examiner*—Susan McFadden
(74) *Attorney, Agent, or Firm*—Robert L. Troike; Frederick J. Telecky, Jr.

(57) ABSTRACT

A method of enrolling phone-based speaker specific commands includes the first step of providing a set of (H) of speaker-independent phone-based Hidden Markov Models (HMMs), grammar (G) comprising a loop of phones with optional between word silence (BWS) and two utterances $U_1$ and $U_2$ of the command produced by the enrollment speaker and wherein the first frames of the first utterance contain only background noise. The processor generates a sequence of phone-like HMMs and the number of HMMs in that sequence as output. The second step performs model mean adjustment to suit enrollment microphone and speaker characteristics and performs segmentation. The third step generates an HMM for each segment except for silence for utterance $U_1$. The fourth step re-estimates the HMM using both utterance $U_1$ and $U_2$.

8 Claims, 2 Drawing Sheets

US 6,377,924 B1

METHOD OF ENROLLING PHONE-BASED SPEAKER SPECIFIC COMMANDS

This application claims priority under 35 USC 119(e)(1) of provisional application No. 60/124,121 filed Mar. 12, 1999.

FIELD OF THE INVENTION

This invention relates to speech recognition and more particularly to enrollment of voice commands which can be recognized to trigger actions.

BACKGROUND OF THE INVENTION

There is a growing demand for voice commands recognition. It has been used for voice name dialing for telephone and user-specific commands such as car controls, computer operations and almost everything that would use the hands to trigger an action. It is even being considered for browsing the Internet. It is the accuracy of the recognition that is important and that is dependent on models generated during enrollment. The recognition of voice commands requires the construction of HMM models on enrollment, during which utterance is recorded and need to build the HMM of the command. Depending on the model level, two types of HMMs can be used. A first and most common type is word-based models which models the whole command (may be several words as a single unit). The second type is phone-based which uses a concatenation of phone-like sub-word units to model a command. The sub-word unit can be represented using speaker-independent HMM as described by N. Jain, R. Cole and E. Barnard in article entitled "Creating Speaker-Specific Phonetic Templates with Speaker-Independent Phonetic Recognizer"; In Proc. IEEE International Conference on Acoustics, Speech, and Signal Processing, page 881–884, Atlanta, May 1996, or speaker specific HMM. While word-based HMMs is easier to train, phone-based HMM has many advantages including various degree of distribution tying and rejection based on phone durations.

SUMMARY OF THE INVENTION

In accordance with one embodiment of the present inventions applicants teach the construction of phone-based HMM for speaker-specific command enrollment comprising the steps of providing a set (H) of speaker-independent phone-based HMMs, providing a gammer (G) comprising a loop of phones with optional between phone silence (BWS) and two utterance ($U_1$ and $U_2$) of the command produced by the enrollment speaker and wherein the first frames of the first utterance containing only background noise, generating a sequence of phone-like unit HMMS and generating the number of HMMs in that sequence.

DESCRIPTION OF PREFERRED EMBODIMENT OF THE PRESENT INVENTION

The descriptions below deals with the enrollment training of one voice command and can be applied to the enrollment of all commands.

Figure 1:
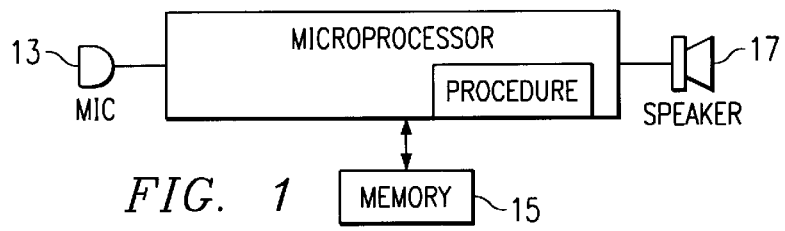
FIG. 1 is a hardware block diagram of the system in accordance with one embodiment of the present invention.
Figure 2:
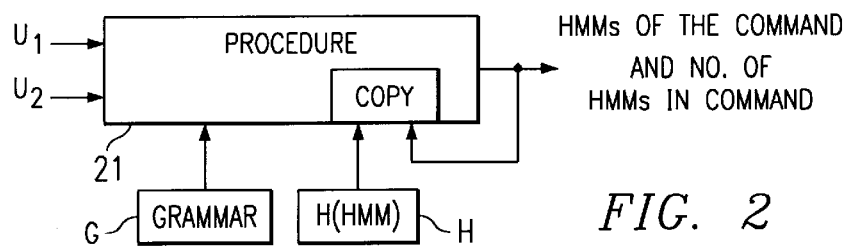
FIG. 2 is a system block diagram of the system in accordance with one embodiment of the present invention.

Referring to FIG. 1, the hardware system 10 comprises a microprocessor 11 such as a Personal Computer (PC) or Digital Signal Processor (DSP) coupled to a microphone 13 to receive speech commands to be enrolled for speech recognition, a memory 15 for storing speech recognition models such as Hidden Markov Models (MM)for each command to be enrolled and for storing processes, and a speaker 17 to output the speech. Procedure software explained below is executed in the processor 11 for operation. Referring to FIG. 2 the operational system comprises the procedure 21 operated by the processor in accordance with a software program where the procedure 21 takes as input:

A set (H) of speaker-independent phone-based HMM's provided in the memory 15 and is loaded in the processor and operated by procedure 21.

Figure 3:
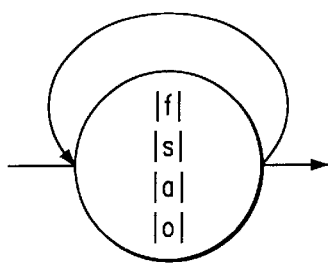
FIG. 3 illustrates a loop of four phones.

A grammar (G) consisting of a loop of phones (as illustrated by example in FIG. 3) with optional between-phone silence (BWS), and Two utterances ($U_1$ and $U_2$) of the command produced by the enrollment speaker into the microphone. The first P frames of the first utterance should contain only background noise. The loop of phones in the example of FIG. 3 is only an illustration of four phones dictated by grammar G. This would also be provided at the memory 15.

The output will produce a sequence of phone-like unit HMMs of the command and the number of HMMs in that command sequence.

Figure 4:
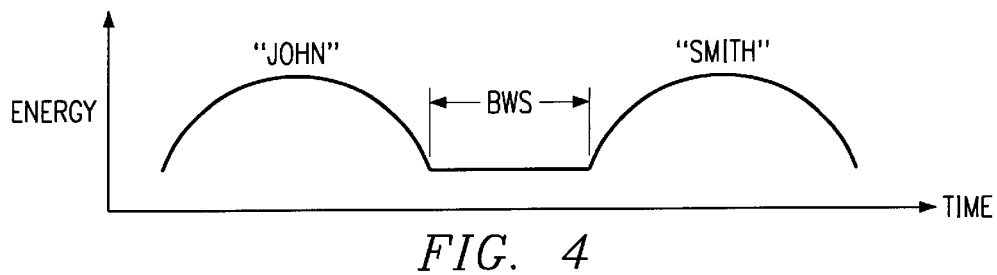
FIG. 4 illustrates the energy distribution for the spoken phrase example of "John Smith"

In the command "John Smith", there is the energy distribution of FIG. 4. There is high energy for "John" and "Smith". Between them is the BWS which can be of any duration. In applicant's phone-based approach, the pause is not reproduced as part of output model.

Figure 5:
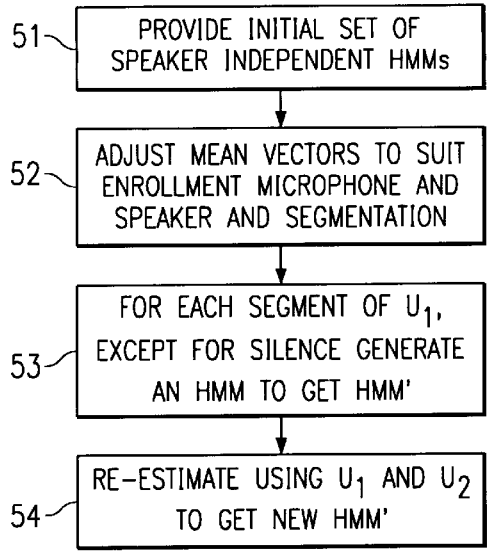
FIG. 5 is an overall function diagram of the procedure in FIG. 2.

Referring to FIG. 5 there is illustrated the process steps for the procedure.

1. In order to recognize phone units in a voice command, the set H of speaker-independent phone-based HMM is required. The set of speaker-independent phone based HMMs is provided in step 51. The initial set (H) of HMMs are a set of sounds or phonemes represented by HMM models that are speaker-independent (SI) models from a large database of many speakers.

To remove transmission channel and microphone effect, cepstral mean normalization is applied during the training of H. The next step 52 performs model mean adjustment and segmentation.

Figure 7:
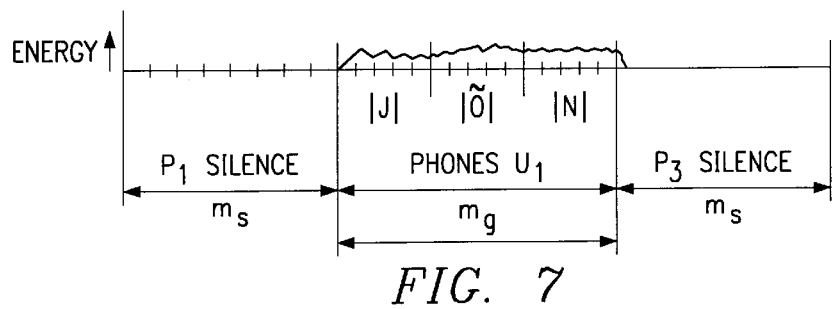
FIG. 7 illustrates the adjustment of mean vectors and segmentation.

In the model mean adjustment and segmentation step 52 in FIG. 5, this step will:

adjust the mean vectors of the initial speaker-independent HMMs as illustrated in step 52 in FIG. 5 to suit the enrollment microphone and speaker characteristics, and use the mean-adjusted HMMs and a phone loop grammar based on grammar G to give a segmentation of the utterance $U_1$. Label, with G and H, $U_1$, resulting L;

L, a segmentation of $U_1$, is the outcome of these steps. It will be used to generate phone-based HMMs of the enrollment utterances. In FIG. 7 the mean for silence $m_s$ of the P frames is represented by, for example, the first $P_1$ frames for silence. In step 06 the labeling is putting the phone time location and name of the phone to each segment of the utterance with grammar G and with H with silence modified. In step 07 the mean for all silence frames is calculated. In FIG. 7, for example, $m_b$ is all silence frames including frames before and after "JON" (set of frames $P_1$ and $P_3$). The Between Word Silence (BWS) is also one of the HMMs. In step 08 the mean vectors of BWS model is replaced with $m_b$. In step 09 the mean $m_p$ of all the speech frames is calculated and in step 10 the mean $m_g$ is subtracted from $m_p$ to get a new mean m̂. In step 11 the new mean is added to all mean vectors of HMM set H, except for silence to get a new H and in step 12 to put the phone time location and the name of the phone to each segment.

The next step 53 in FIG. 5 is to generate for each segment of utterance $U_1$ the generation of phone HMMs.

The step 53 following will:

Based on the length of each phone segment, generate an HMM for each phone segment.

Initialize the variance of all generated HMMs to a single global variance vector. Conventional HMM state variance estimation procedure will underestimate the variance, since only two observations of the command are available.

1 For each segment s of $U_1$, except for silence segment
  1.1 Generate a HMM with
    initial entry state set to the first state only
    duration of s as number of emission states
    transition probabilities: 0.1 (self-loop), 0.8 (next) and 0.1 (skip)
    one Gaussian probability density per state
    the mean vector at state i set to s[i]
2 Set the variance of each state to the square root of the utterance variance of $U_1$ Step 2 is a heuristic practice, supported by experimental results.

The output of step 53 is a new set of HMMs (H').

Re-estimation of phone HMMs

Figure 8:
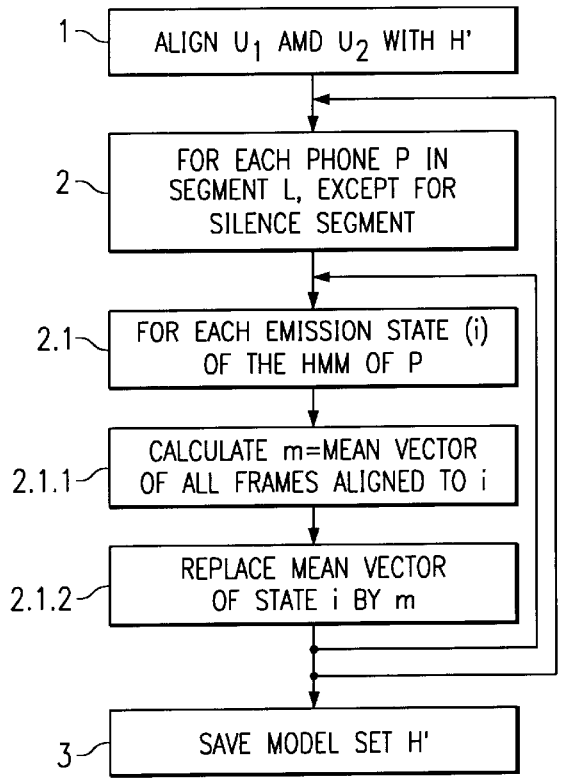
FIG. 8 is a function diagram of the re-estimation steps.

The mean vectors of the set of phone models H' generated above instep 53 are initialized with $U_1$. They need to be re-estimated using $U_1$ and $U_2$. This is achieved in Step, 54 with following steps in illustrated in FIG. 8 and listed below:
1 Align $U_1$ and $U_2$ with HMMs H', against segment L obtained from step-12 of overall step 52.
2 For each phone p in segment L, except for silence segment
  2.1 For each emission state i of the HMM of p
    2.1.1 Calculate m=mean vector of all frames aligned to i
    2.1.2 Replace the mean vector of state i by m
3 Save the model set H' for recognition use.

The resulting HMM set is now ready to be used for the recognition. The enrollment is completed.

Storage Requirement

To minimize the storage of command HMM, several techniques are used:

For an individual HMM, only the state mean vectors need to be stored. Initial probabilities, transition probabilities, etc. are all constants independent of the enrollment and thus do not need to be stored.

After enrollment training, the names of the phone HMMs are replaced by an index number, because to evaluate the probability of a test utterance the reorganizer does not need to know the name of each individual HMM.

The grammar that describes the voice command in terms of phone HMMs is linear, i.e., a phone is connected to its next with no loops and skips, which can be built at the recognition time. Therefore, no storage is required.

Experimental Results

Training Materials

The initial speaker-independent models (H) is trained on a 8 kHz TI-DIGITS database. The database contains 8614 utterances of 1–7 digits, uttered by 112 speakers. The observation vectors consist of 8 DFT mel-frequency cepstral coefficients (MFCC), along with their regression-based first-order time derivative, derived at a frame rate of 20 milliseconds (mm).

Test Materials

The task is hands-free voice name-dialing in car. The recording took place in 4 sessions. In each session, 2 speakers read 50 names, totaling 100 utterances per speaker per session. The sessions correspond to different car operation condition, as given in the first two columns of Table-1.

Evaluation Results

The task requires the recognition of 50 person names. Utterances is parked-turn session was used as enrollment data. The trained models are then used to recognize the speech recorded during the rest three sessions. To compensate for background noise, parallel model combination for noise compensation is used throughout the tests. The recognition error rate is given in the last column of Table-1.

| Session | Vehicle condition | WER % |
| --- | --- | --- |
| parked-turn | parked, engine off | — |
| parked-eval | parked, engine off | 0.15 |
| stop-n-go | circulating in city streets | 0.15 |
| highway | operating on highway | 0.35 |

Conclusion

The enrollment procedure of the phone-based HMM representation of speaker-dependent commands can give recognition as good as word-based models.

The use of initial HMM to phonetically label the enrollment utterances makes it possible to use existing knowledge on speech variation, which may help to give more reliable end-pointing the speech.

Phone-based models have the possibility of sharing distributions among different occurrence of a same phone. It is, also possible to exploit phone durations as additional information for rejection.

Figure 6:
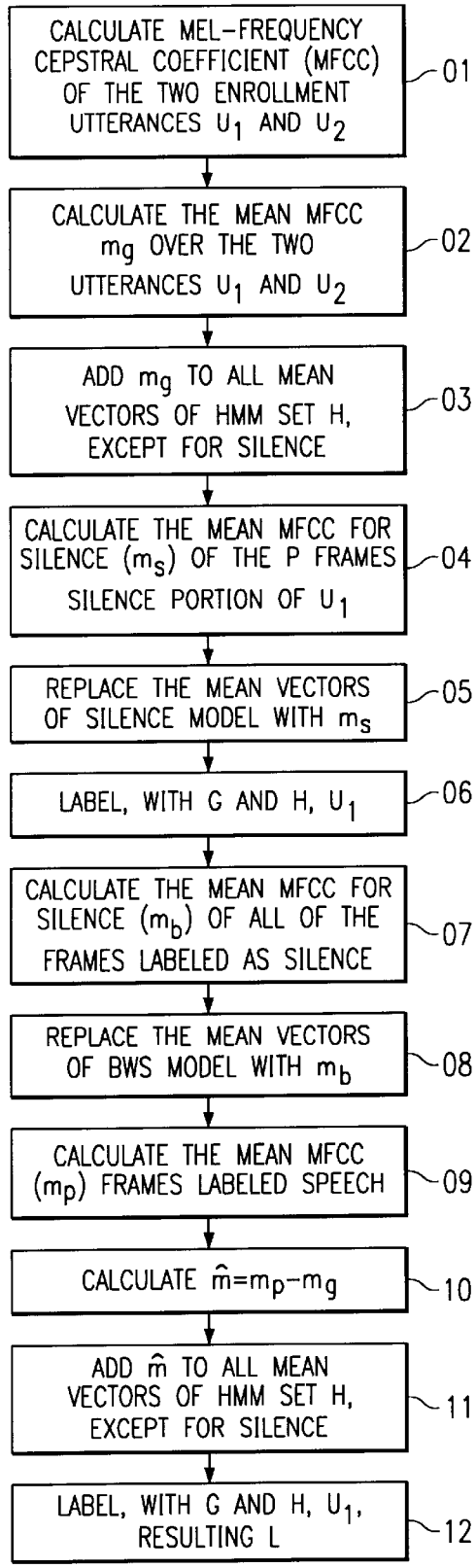
FIG. 6 is a function diagram of the adjustment of mean vectors and segmentation steps.

The steps to accomplish overall step 52 follows with reference to FIG. 6: Calculate mel-frequency cepstral coefficient (MFCC) of the two enrollment utterances $U_1$ and $U_2$, 02. Calculate the mean MFCC mfg over the two utterances $U_1$ and $U_2$; (See FIG. 7) 03. Add mg to all mean vectors of "MM" set H, except for silence; Calculate the mean MFCC for silence (m,) of the P frames silence portion of [U]; (See FIG. 7) 05. Replace the mean vectors of silence model with m; Label, with G and H. UJ, 07. Calculate the mean MFCC for silence (mb) of all of the frames labeled as silence; (See FIG. 7) 08. Replace the mean vectors of BWS model with mb; 09. Calculate the mean MFCC (mp) frames labeled speech; 10. Calculate m=Mpfmg; 11. Add mt to all mean vectors of MM set H, except for silence; LPageK-ffirst complete paragraph at lines, please change eo reaaas follows:

In step 01, the calculation step is described by S. B. Davis and P. Mernelstein in an article entitled "Comparison of Parametric Representation for Monosyllabic Word Recognition in Continuously Spoken Sentences", IEEE Trans, Acoustics, Speech and Signal Processing, August, 1980, Volume ASSP-28, No. 4, pp 357–366. In step 02 the step is to remove the absolute bias. In FIG. 7 the mean MFCC m is represented by the segments for "J", "O" and "N".

What is claimed is:

1. A method of enrolling phone based speaker specific commands in a speech recognition system comprising the steps of:
   (a) providing an initial set of speaker-independent phone-based Hidden Markov Models H, and a grammar(G);
   (a1) receiving a first speech utterance $U_1$ and a second speech utterance $U_2$ from an enrollment speaker;
   (b) adjusting mean vectors of said initial set of speaker-independent phone-based Hidden Markov Models to suit the enrollment microphone and speaker characteristics and using the mean adjusted vectors of said set of speaker-independent phone-based Hidden Markov Models and phone loop grammar to produce a segmentation of the utterance $U_1$;
   (c) generating a Hidden Markov Model H' for each phone segment based on the length of each phone segment and setting the variance of each state to the square root of the utterance $U_1$; and
   (d) re-estimating the mean vectors of the set of phones models using utterances $U_1$ and $U_2$ to provide a new model set H' for speech recognition.

2. The method of claim 1 wherein said re-estimating step includes the steps of:
   aligning $U_1$ and $U_2$ with Hidden Markov Models H', against a segmentation of utterance $U_1$;
   for each phone p in said segmentation, except for silence segment and for each emission state i of the Hidden Markov Models of p calculating m=mean vector of all frames aligned to i and replace the mean vector of state i by m; and providing the model set H' for recognition use.

3. The method of claim 2 wherein step c includes for each segment of $U_1$, except for silence segment, generating Hidden Markov Model H' with the initial entry state set to the first state only, the duration of s as the number of emission states, the transition probabilities are: 0.1 (self-loop), 0.8 (next) and 0.1 (skip), one Gaussian probability density per state, and the mean vector at state i set to s(i).

4. The method of claim 2 wherein said step b comprises the steps of:
   (1) calculating the mean mel-frequency cepstral coefficient $m_g$ over the two utterances $U_1$ and $U_2$;
   (2) calculating the mean vectors of said initial set of Hidden Markov Models H over the two utterances $U_1$ and $U_2$;
   (3) adding $m_g$ to all vectors of said initial set of Hidden Markov Models, except for silence;
   (4) calculating the mean mel-frequency cepstral coefficient for silence ($m_s$) of the first P frames of the silence portion of utterance $U_1$;
   (5) replacing the mean vectors of silence model with $m_s$;
   (6) labeling utterenace $U_1$ with G and H:
   (7) calculating the mean mel-frequency cepstral coefficient for silence of all of the frames labeled as silence $m_b$;
   (8) replacing mean vectors of between word silence model with $m_b$;
   (9) calculating the mean mel-frequency cepstral coefficient frames labeled speech $m_p$;
   (10) calculating $\hat{m}=m_p-m_g$;
   (11) adding $\hat{m}$ to all vectors of said set of Hidden Markov Models H' except for silence; and
   (12) labeling utterance $U_1$ with G and H to provide segmentation L.

5. The method of claim 3 wherein said step b comprises the steps of:
   (1) calculating the mean mel-frequency cepstral coefficient $m_g$ over the two utterances $U_1$ and $U_2$;
   (2) calculating the mean vectors of said initial set of Hidden Markov Models H over the two utterances $U_1$ and $U_2$;
   (3) adding $m_g$ to all vectors of said initial set of Hidden Markov Models H, except for silence;
   (4) calculating the mean mel-frequency cepstral coefficient for silence ($m_g$) of the first P frames of the silence portion of utterance $U_1$;
   (5) replacing the mean vectors of silence model with $m_s$;
   (6) labeling utterance $U_1$ with G and H;
   (7) calculating the mean mel-frequency cepstral coefficient for silence of all of the frames labeled as silence $m_b$;
   (8) replacing mean vectors of between word silence model with $m_b$;
   (9) calculating the mean mel-frequency cepstral coefficient frames labeled speech $m_p$;
   (10) calculating $\hat{m}=m_p-m_g$;
   (11) adding $\hat{m}$ to all vectors of said set of Hidden Markov Models H', except for silence; and
   (12) labeling utterance $U_1$ with G and H to provide segmentation L.

6. The method of claim 1 wherein said step b comprises the steps of:
   (1) calculating the mean mel-frequency cepstral coefficient $m_g$ over the two utterances $U_1$ and $U_2$;
   (2) calculating the mean vectors of said initial set of Hidden Markov Models H over the two utterances $U_1$ and $U_2$;
   (3) adding $m_g$ to all vectors of said initial set of Hidden Markov Models H, except for silence;
   (4) calculating the mean mel-frequency cepstral coefficient for silence ($m_s$) of the first P frames of the silence portion of utterance $U_1$;
   (5) replacing the mean vectors of silence model with $m_s$;
   (6) labeling utterance $U_1$ with G and H;
   (7) calculating the mean mel-frequency cepstral coefficient for silence of all of the frames labeled as silence $m_b$;
   (8) replacing mean vectors of between word silence model with $m_b$;
   (9) calculating the mean mel-frequency cepstral coefficient frames labeled speech $m_p$;
   (10) calculating $\hat{m}=m_p-m_g$;
   (11) adding $\hat{m}$ to all vectors of said set of Hidden Markov Models H' except for silence; and
   (12) labeling utterance $U_1$ with G and H to provide segmentation L.

7. The method of claim 1 wherein step c includes for each segment of $U_1$, except for silence segment, generating Hidden Markov Model H' with the initial entry state set to the first state only, the duration of s as the number of emission states, the transition probabilities are: 0.1 (self-loop), 0.8 (next) and 0.1 (skip), one Gaussian probability density per state, and the mean vector at state i set to s(i).

8. The method of claim 7 wherein said step b comprises the steps of:

(1) calculating the mean mel-frequency cepstral coefficient $m_g$ over the two utterances $U_1$ and $U_2$;

(2) calculating the mean vectors of said initial set of Hidden Markov Models H over the two utterances $U_1$ and $U_2$;

(3) adding $m_g$ to all vectors of said initial set of Hidden Markov Models H, except for silence;

(4) calculating the mean mel-frequency cepstral coefficient for silence ($m_s$) of the first P frames of the silence portion of utterance $U_1$;

(5) replacing the mean vectors of silence model with $m_s$;

(6) labeling utterance $U_1$ with G and H;

(7) calculating the mean mel-frequency cepstral coefficient for silence of all of the frame labeled as silence $m_b$;

(8) replacing mean vectors of between word silence model with $m_b$;

(9) calculating the mean mel-frequency cepstral coefficient frames labeled speech $m_p$;

(10) calculating $\hat{m}=m_p-m_g$;

(11) adding $\hat{m}$ to all vectors of said set of Hidden Markov Models H', except for silence; and

(12) labeling utterance $U_1$ with G and H to provide segmentation L.

* * * * *